United States Patent
Chun et al.

(10) Patent No.: US 7,471,943 B2
(45) Date of Patent: Dec. 30, 2008

(54) METHOD FOR PROCESSING A SECURITY SETUP CONTROL MESSAGE IN MOBILE COMMUNICATION SYSTEM

(75) Inventors: Sung Duck Chun, Seoul (KR); Seung June Yi, Seoul (KR); Young Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 10/777,843

(22) Filed: Feb. 11, 2004

(65) Prior Publication Data

US 2004/0162065 A1    Aug. 19, 2004

Related U.S. Application Data

(63) Continuation-in-part of application No. 10/746,985, filed on Dec. 23, 2003, now abandoned.

(30) Foreign Application Priority Data

Feb. 11, 2003  (KR) .................. 10-2003-0008512

(51) Int. Cl.
*H04M 1/66* (2006.01)
(52) U.S. Cl. .................. 455/410; 455/411; 380/270
(58) Field of Classification Search .............. 455/410, 455/435.1, 422.1, 411
See application file for complete search history.

(56) References Cited

U.S. PATENT DOCUMENTS

| 6,449,473 | B1 * | 9/2002 | Raivisto ................. 455/410 |
| 2002/0092425 | A1 * | 7/2002 | Nimberger et al. ........... 96/413 |
| 2004/0029576 | A1 * | 2/2004 | Flykt et al. ............... 455/422.1 |
| 2004/0092248 | A1 * | 5/2004 | Kelkar et al. ............... 455/411 |

FOREIGN PATENT DOCUMENTS

| EP | 0 977 452 A3 | 12/2000 |
| RU | 2132597 | 6/1999 |
| WO | WO 02/45453 A1 | 6/2002 |

OTHER PUBLICATIONS

3rd Generation Partnership Project; Technical Specification Group Services and System Aspects; 3G Security; Security Architecture (Release 5) 3GPP TS 33.102 V5.0.0 (Jun. 2002).

* cited by examiner

*Primary Examiner*—Temica M Beamer
(74) *Attorney, Agent, or Firm*—Lee, Hong, Degerman, Kang & Schmadeka

(57) ABSTRACT

Disclosed is a method for processing a security setup control message in a mobile communication system. The present invention provides an apparatus and method of securing integrity protection for a received security setup control message such that the processing of future messages is not impacted if the security setup control message is deemed unreliable and discarded.

28 Claims, 7 Drawing Sheets

METHOD FOR PROCESSING A SECURITY SETUP CONTROL MESSAGE IN MOBILE COMMUNICATION SYSTEM

CROSS-REFERENCE TO RELATED APPLICATIONS

Pursuant to 35 U.S.C. § 119(a), this application claims the benefit of earlier filing date and right of Korean Application No. 10-2003-008512 filed on Feb. 11, 2003, hereby incorporated by reference herein in its entirety. This application is also a continuation-in-part (CIP) of prior-filed U.S. application Ser. No. 10/746,985, filed on Dec. 23, 2003, now abandoned which is hereby incorporated by reference in its entirety.

BACKGROUND OF THE INVENTION

1. Field of the Invention

The present invention relates to a message processing method applied to a mobile communication system, and more particularly, to a method for processing a security setup control message.

2. Description of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

FIG. 1 shows a network structure of a general UMTS. As shown in FIG. 1, the UMTS includes user equipment (UE) or a terminal 100 such as a mobile station or a subscriber unit, a UMTS terrestrial radio access network (UTRAN) 200, and a core network (CN) 300. The UTRAN 200 includes one or more radio network sub-systems (RNS). Each RNS includes a radio network control (RNC) and at least one Node B managed by the RNC.

Each Node B receives information sent by the physical layer of a terminal 100 through an uplink and transmits data to a terminal through a downlink. Each Node B operates as an access point of the UTRAN 200 for terminal 100.

Each RNC performs functions which include assigning and managing radio resources and operates as an access point with respect to the core network 300. A primary function of the UTRAN 200 is constructing and maintaining a radio access bearer (RAB) for a call connection between the terminal 100 and the core network 300. The core network 300 applies end-to-end quality of service (QoS) requirements to the RAB and the RAB supports QoS requirements set up by the core network. Accordingly, the UTRAN 200 can satisfy the end-to-end QoS requirements by constructing and maintaining the RAB.

The RAB service is divided into an Iu bearer service and a radio bearer service. The Iu bearer service handles reliable user data transmission between boundary nodes of the UTRAN 200 and the core network 300, while the radio bearer service handles reliable user data transmission between the terminal 100 and UTRAN 200.

FIG. 2 illustrates a radio protocol between the terminal 100 and the UTRAN 200 on the basis of the 3GPP wireless access network standards. The radio protocol is vertically formed of a physical layer, a data link layer and a network layer, and is horizontally divided into a user plane for transmitting data information and a control plane for transmitting a control signal.

The user plane is a region to which user traffic information, such as voice or an IP packet, is transmitted. The control plane is a region to which control information, such as that related to interface of a network or maintenance and management of a call, is transmitted. In FIG. 2, protocol layers can be divided into a first layer (L1), a second layer (L2) and a third layer (L3) based on three lower layers of an open system interconnection (OSI) standard model well known in communication systems.

The first layer (L1) or physical (PHY) layer provides information transfer service to the upper layer by using various radio transfer techniques. The PHY layer is connected to the media access control (MAC) layer through a transport channel, and data is transferred between the MAC layer and the PHY layer through the transport channel. The MAC layer provides a re-allocation service of the MAC parameters for allocation and re-allocation of radio resources.

The MAC layer is connected to the radio link control (RLC) layer through a logical channel, and various logical channels are provided according to the type of information transmitted. In general, when information of the control plane is transmitted, a control channel is used and when information of the user plane is transmitted, a traffic channel is used.

The MAC layer is classified into a MAC-b sublayer, a MAC-d sublayer and a MAC-c/sh sublayer according to types of managed transport channels. The MAC-b sublayer manages a broadcast channel (BCH) handling broadcast of system information. The MAC-c/sh sublayer manages a shared transport channel such as a forward access channel (FACH), downlink shared channel (DSCH), or the like which is shared with other terminals 100.

In the UTRAN 200, the MAC-c/sh sublayer is positioned at a control RNC (CRNC) and manages channels shared by every terminal 100 in a cell, so that one MAC-c/sh sublayer exists in each cell. The MAC-d sublayer manages a Dedicated Channel (DCH) which is a dedicated transport channel for a specific terminal 100. Accordingly, the MAC-d sublayer is positioned at a serving RNC (SRNC) managing a corresponding terminal 100, and one MAC-d sublayer also exists at each terminal.

The RLC layer supports reliable data transmission and may perform segmentation and concatenation of an RLC service data unit (SDU) from a higher layer. The RLC SDU transferred from a higher layer is adjusted in size according to throughput capacity at the RLC layer, header information is added, and the data transferred in the form of a protocol data unit (PDU) to the MAC layer. The RLC layer includes an RLC buffer for storing the RLC SDU or the RLC PDU from a higher layer.

A broadcast/multicast control (BMC) layer schedules a cell broadcast message (CB) transferred from the core network 300 and broadcasts the CB to a terminal 100 positioned in one or more specific cells. At the UTRAN 200, the CB message transferred from the upper layer is combined with information, such as a message ID, a serial number or a coding scheme. The resulting message is transferred in the form of a BMC message to the RLC layer and to the MAC layer through a common traffic channel (CTCH), which is a logical channel. The CTCH is mapped to a forward access channel (FACH), a transport channel, and a secondary common control physical channel (S-CCPCH), which is a physical channel.

A packet data convergence protocol (PDCP) layer is an upper layer of the RLC layer which allows data to be transmitted effectively on a radio interface with a relatively small bandwidth through a network protocol such as the IPv4 or the IPv6. The PDCP layer reduces unnecessary control information, a function called header compression. Toward this end, RFC2507 and RFC3095, which are robust header compression (ROHC) techniques defined by an Internet standardization group such as an Internet engineering task force (IETF), may be used. In these methods, only the information required for the header part of data, or control information, is transmitted. Therefore, the amount of data transmitted may be reduced.

The radio resource control (RRC) layer positioned in the lowest portion of the third layer (L3) is defined only in the control plane and controls the logical channels, the transport channels, and the physical channels with regard to setup, reconfiguration, and release of the radio bearers (RB). Upon request from higher layers, an RRC layer controls transport and physical channels to perform the establishment, reconfiguration, and release of RB. The RB signify a service provided by the second layer (L2) for data transmission between the terminal 100 and UTRAN 200. Setting up the RB includes stipulating the characteristics of a protocol layer and a channel, which are required for providing a specific service, and setting the respective detailed parameters and operation methods.

Various channels for receiving and transmitting data are defined for use between a terminal 100 and UTRAN 200. Data is sent and received between the PHY layer of a terminal 100 and that of the UTRAN 200 using a physical channel. In addition to the physical channel, data transport paths between the protocol layers are defined as transport and logical channels in the radio access network of the UMTS. The logical channels are provided for data exchange between the RLC and MAC layer, while the transport channels are provided for data exchange between the MAC layer and PHY layer. Mapping between transport channels is performed in the MAC layer, while mapping between the transport and PHY layer is performed in the PHY layer.

Various types of messages are received and transmitted between the terminal 100 and UTRAN 200. Security checks are performed to protect data contained in the messages. Security checks may include ciphering and integrity check.

Ciphering adds a specific mask, known only to the transmitting and receiving parties, to a message such that a third party not knowing the mask is unable to recognize the contents of the message. Integrity check is utilized to check whether an unauthorized third party has altered the contents of the message or whether an unauthenticated party made the transmission. Integrity check is also performed to check whether a third party intentionally changed the contents of the received message.

In the UMTS, the ciphering and the integrity check are simultaneously carried out on most messages transferred to the RRC layer and most control messages transmitted to the upper layers of the RRC layer. Ciphering is also performed on other general user data. Integrity check can be carried out in the RRC layer.

To determine if the contents of a message were changed by a third party between the transmitting and receiving parties or to filter a message transmitted from an unauthenticated transmitting party, the receiving party performs integrity check on the received message. The received message is processed or discarded according to the results of the integrity check.

One of the received messages may be a security setup control message. For communication between a terminal 100 and the network, for example the UTRAN 200, a security setup control message is used for initiating secure message transmission. Furthermore, a security setup control message may be used for controlling security variables that are used for the connection over which the secure messages are transmitted.

Referring to FIG. 3, a conventional method (S10) for processing a general message is illustrated. When a terminal 100 receives a general message (S11), an integrity check is performed (S12). The integrity check may utilize security variables which are set based on information contained in security setup control messages.

In accordance with the result of the integrity check, the general message is either processed or discarded. If the general message passes the integrity check, it is processed (S13). If the general message fails the integrity check, it is discarded (S14).

Information related to controlling the security variables, which may be contained in a security setup control message, is called security-related environment variables or security setup information. Since security setup information contained in a security setup control message is also vulnerable to alteration by an unauthenticated third party or may be transmitted by an unauthenticated transmitting party, the security setup information may also be unreliable.

Therefore, there is a need for an apparatus and method of processing a security setup control message such that future general messages may still be exchanged between the receiving and transmitting parties when a security setup control message is deemed unreliable and discarded due to a failed integrity check. The present invention addresses these and other needs.

SUMMARY OF THE INVENTION

The present invention is directed to an apparatus and method for processing a security setup control message in a mobile communication system. Specifically, the present invention is directed to an apparatus and method for ensuring the reliability of security setup information contained in the security setup control message by providing security check for a security setup control message such that future exchanges between the receiving and transmitting parties is not impacted when a security setup control message is deemed unreliable.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus and method for processing a security setup control message in a mobile communication system according to the present invention includes performing security check on the message and discarding or processing the message according to the result of the security check as well as updating the value of one of more security variables only when the message is deemed reliable.

In one aspect of the present invention, a method is provided for processing a security setup control message. The method includes verifying the integrity of the security setup control message and updating the value of one or more security variables if the integrity of the message is verified and discarding the message and leaving the value of the security variables unchanged if the integrity of the message is not verified. Security setup information used to update the security variables may be extracted from a verified message.

The method may also include storing, at least temporarily, the previous value of the security variables until the security setup control message is verified. If the security setup control message is not verified, the previous value of the security variables is not lost.

The verification of the security setup control message may include generating an authentication value, or expected message authentication code, related to the message and comparing the authentication value to a message authentication code received with the message. If the expected message authentication code and received message authentication code are equal, the message is processed. If the expected message authentication code and received message authentication code are not equal, the message is discarded. Preferably the expected message authentication code is generated using a standardized integrity check authentication generation algorithm adopted by 3GPP.

In another aspect of the present invention, an apparatus is provided having means for verifying the integrity of a security setup control message and updating the value of one or more security variables. If the integrity of the security setup control message is verified, the message is processed and the security variables are updated, for example based on security setup information contained in the message. If the integrity of the security setup control message is not verified, the message is discarded and the security variables are unchanged from a previous value.

Means may be provided to store, at least temporarily, the previous value of the security variables until the security setup control message is verified. If the security setup control message is not verified, the previous value of the security variables is then refreshed.

It is contemplated that the apparatus may be located in UE, the UTRAN, or both. Preferably, the means for storing the value of the security variables is a memory or shift register and the means for verifying the integrity of the security setup control message is a processor having software stored on a recording medium.

The verification of the security setup control message may include generating an authentication value, or expected message authentication code, related to the message and comparing the authentication value to a message authentication code received with the message. Preferably the expected message authentication code is generated using a standardized integrity check authentication generation algorithm adopted by 3GPP.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for processing a security setup control message in a mobile communication system that ensures the reliability of security setup information used to update the value of one or more security variables such that the previous value of the security variables is left unchanged if the message is deemed unreliable.

Although the present invention is illustrated with respect to a mobile communication device such as UE or mobile station, it is contemplated that the present invention may be utilized anytime it is desired to verify the reliability of a data message used to update the value of variables used for message security purposes. It is further contemplated that the present invention may be utilized in UE, the UTRAN, or both.

Figure 1:
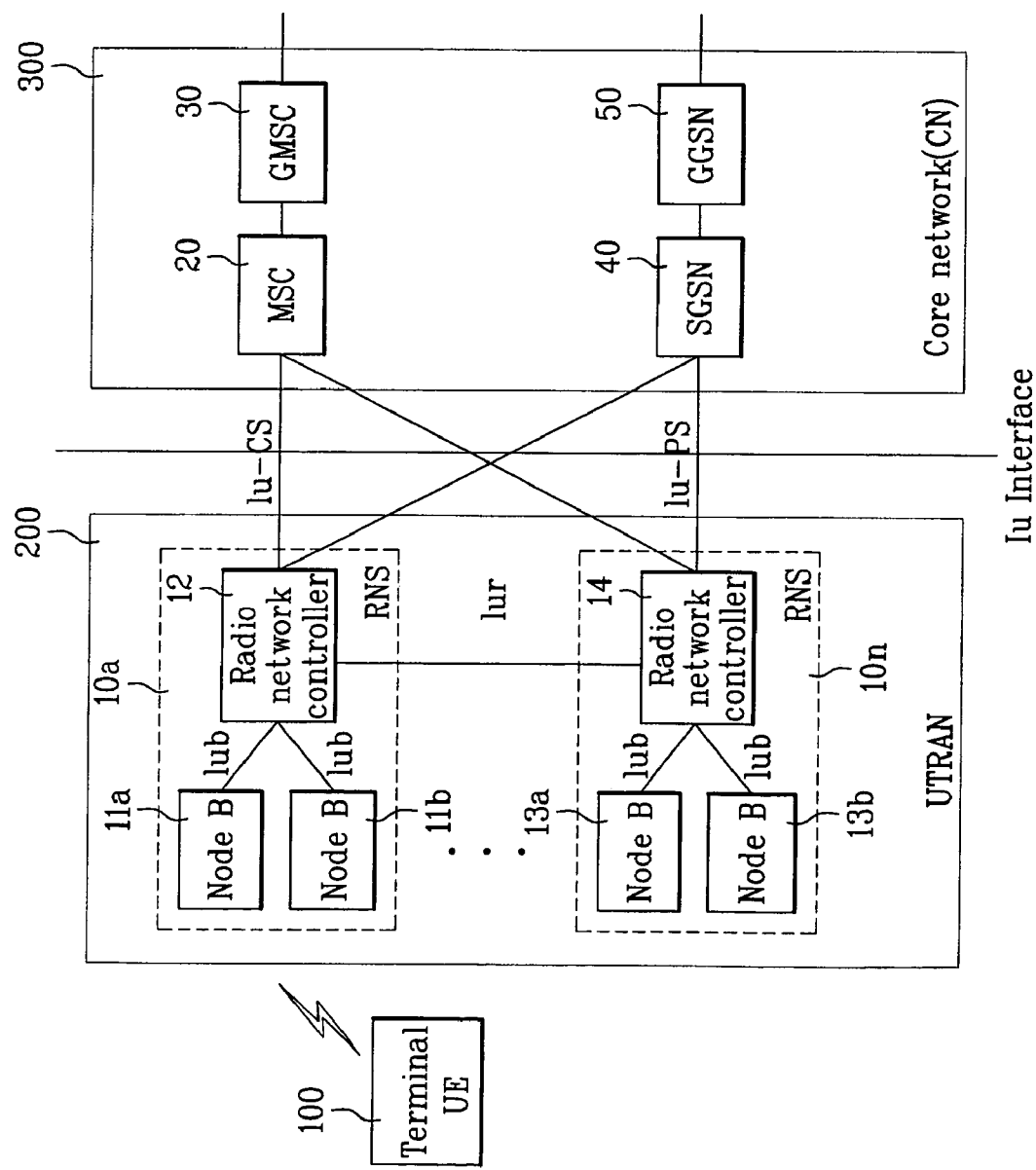
FIG. 1 is a block diagram illustrating a network structure of a conventional UMTS.
Figure 2:
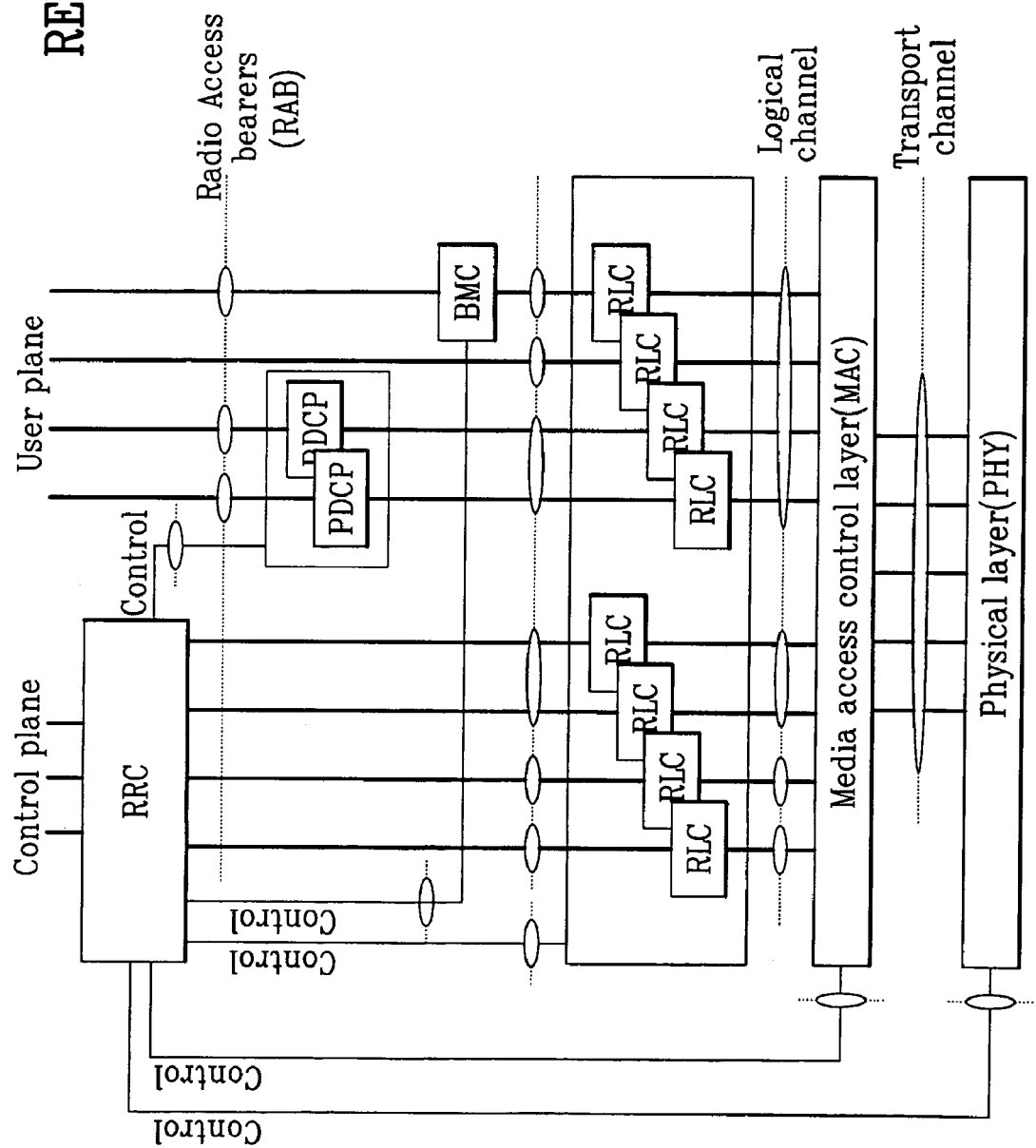
FIG. 2 is a block diagram illustrating a conventional radio protocol between UE and the UTRAN according to 3GGP wireless access standards.
Figure 3:
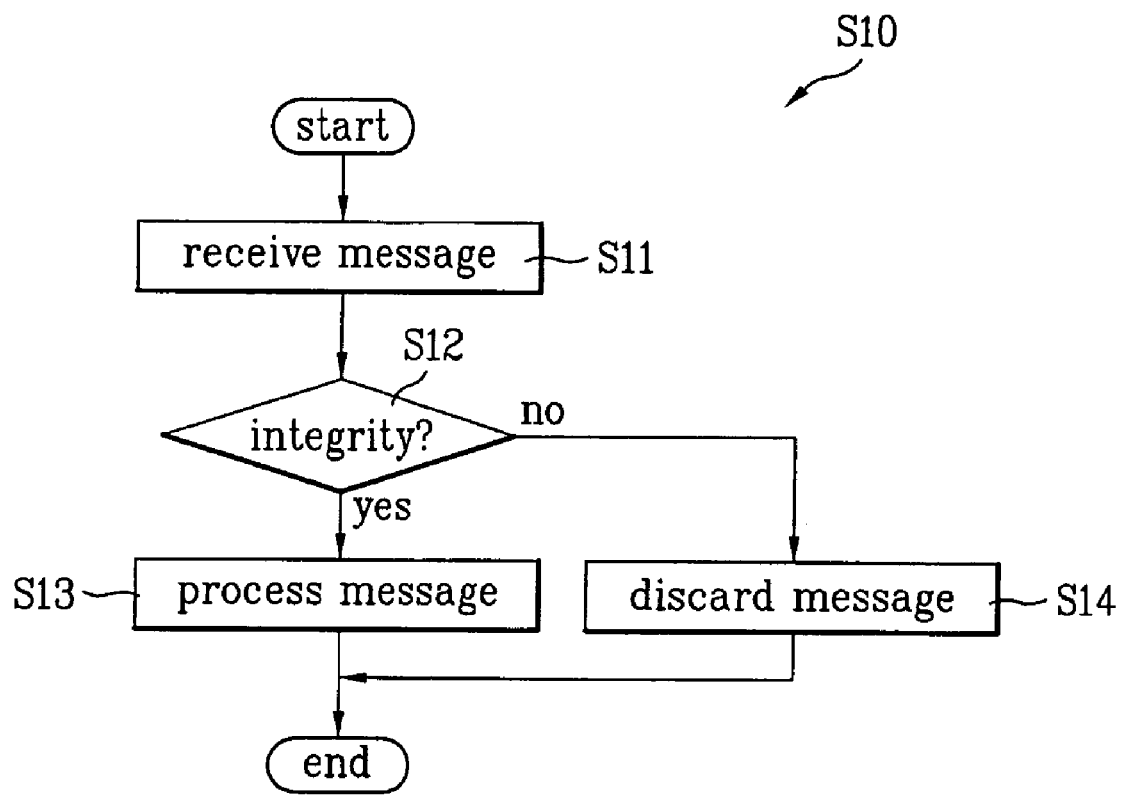
FIG. 3 is a flowchart illustrating a conventional method for processing a general message.
Figure 4:
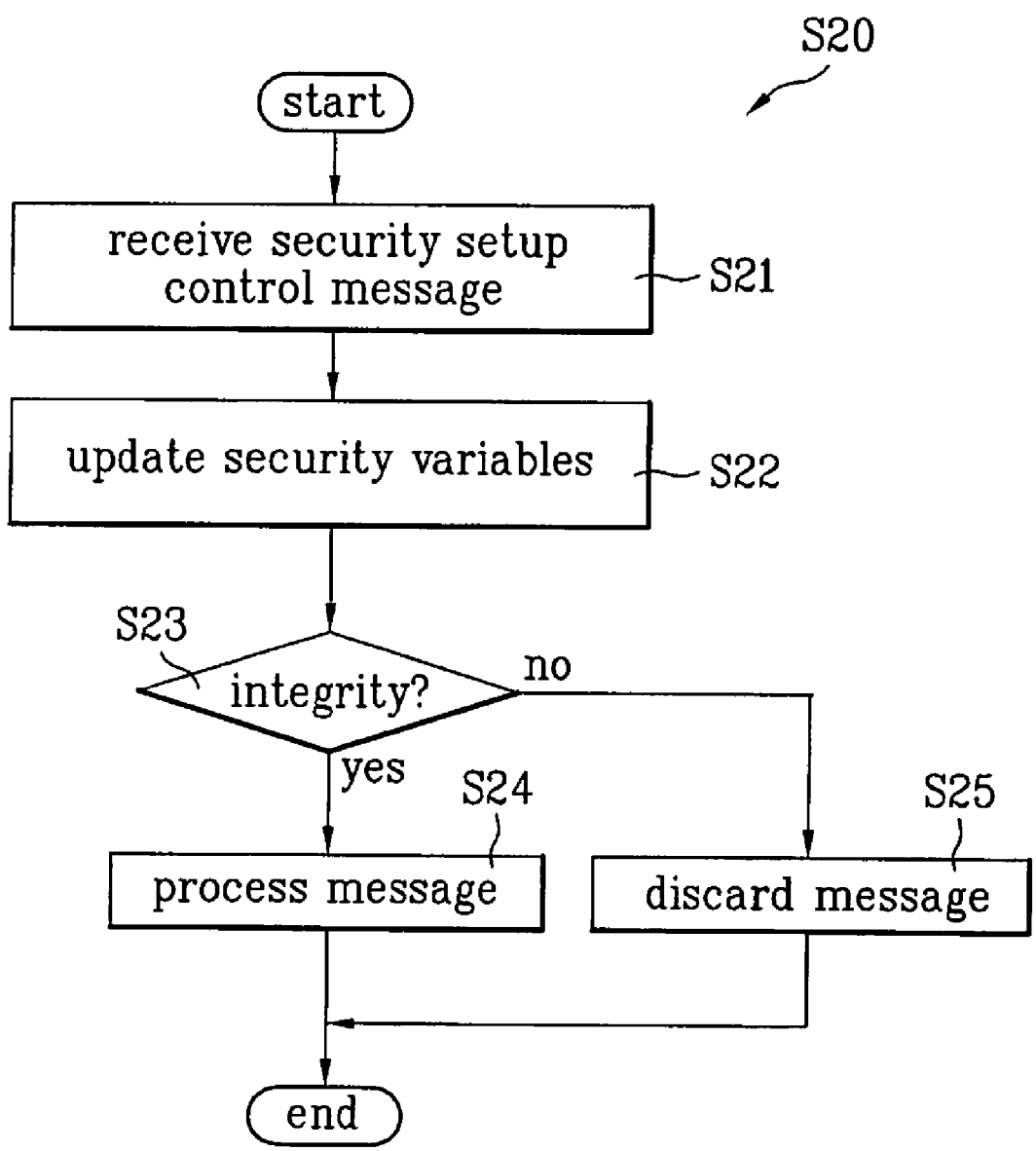
FIG. 4 is a flowchart illustrating a method for processing a security setup control message in a mobile communication system.

Referring to FIG. 4, a method (S20) for processing a security setup control message in a mobile communication system is illustrated. When a security setup control message is received (S21), security variables are updated using new security setup information and the previous values of the security variables are discarded (S22).

A security check is performed on the security setup control message using the updated security variables (S23). The security check may include integrity check. If the security setup control message passes the integrity check, the message is processed (S24). If the security setup control message fails the integrity check, the message is discarded (S25).

However, if the security setup control message is deemed unreliable and discarded, security setup information contained in the message may also be unreliable. Since the security variables may have already been updated with the potentially unreliable security setup information from the discarded security setup control message, the security variables of the receiving party may no longer coincide with those of a transmitting party. Therefore, the transmitting party and receiving party may be unable to exchange future general messages, whose integrity depends on the security variables, and the receiving party may not be provided with further requested services.

Figure 5:
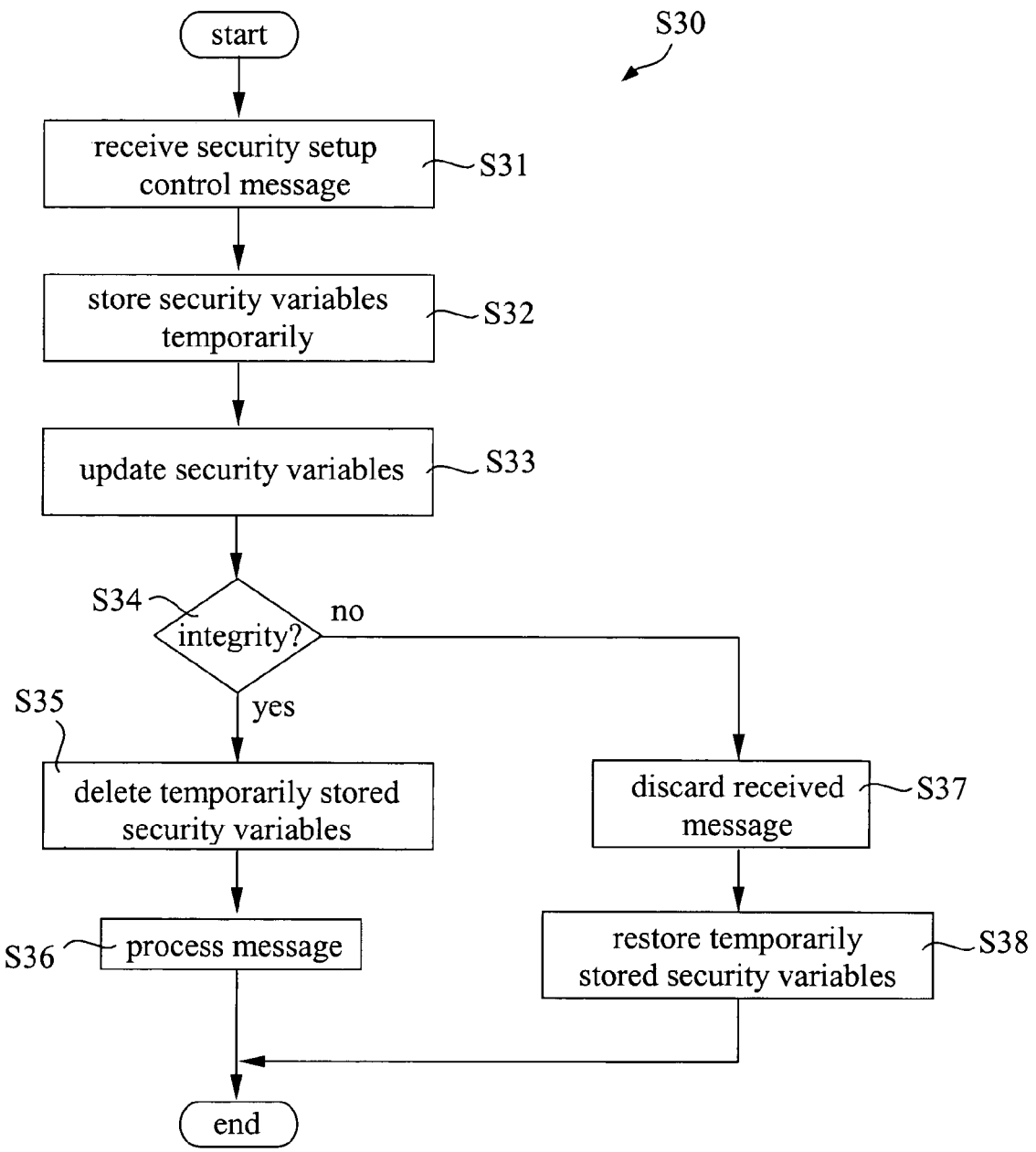
FIG. 5 is a flowchart illustrating a method for processing a security setup control message according to one embodiment of the present invention.

FIG. 5 illustrates a method (S30) for processing a security setup control message according to one embodiment of the present invention. After a security setup control message is received (S31), the present value of security variables are temporarily stored (S32), for example in memory, and the value of one or more security variables are updated using new security setup information (S33), for example information contained in the received security setup control message. An integrity check is then performed on the security setup control message using the updated security variables (S34).

If the security setup control message passes the integrity check, the temporarily stored values of the security variables are deleted (S35) and the message is processed (S36). Thereafter, integrity check is performed on received messages using the updated security variables.

If the security setup control message fails the integrity check, the message is discarded (S37) and the temporarily stored values of the previous security variables are restored (S38). Processing of future received messages is handled as if the security setup control message was never received and messages are processed using the restored security variables.

Figure 6:
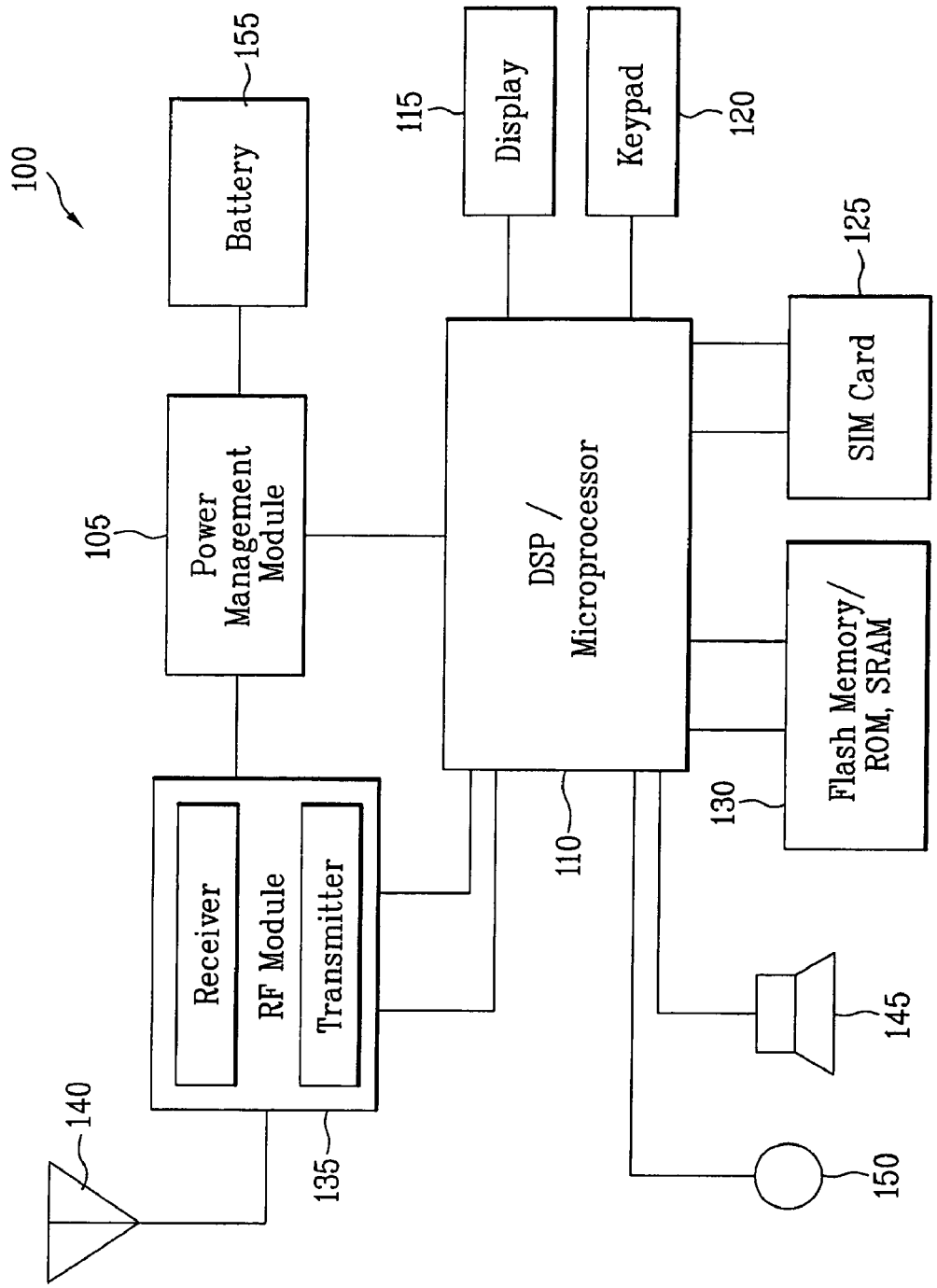
FIG. 6 is a block diagram illustrating an apparatus for performing the method illustrated in FIG. 5.

Referring to FIG. 6, a block diagram of an apparatus 100 is illustrated, for example a mobile station or UE for performing the method of the present invention illustrated in FIG. 5. The mobile station 100 includes a processing unit 110 such as a microprocessor or digital signal processor, an RF module 135, a power management module 105, an antenna 140, a battery 155, a display 115, a keypad 120, a memory unit 130 such as flash memory, ROM or SRAM, a speaker 145, a microphone 150, and, optionally, a SIM card 125.

A user enters instructional information, such as a telephone number, for example, by pushing the buttons of a keypad 120 or by voice activation using the microphone 150. The processing unit 110 receives and processes the instructional information to perform the appropriate function, such as to dial the telephone number. Operational data may be retrieved from the Subscriber Identity Module (SIM) card 125 or the memory unit 130 to perform the function. Furthermore, the processing unit 110 may display the instructional and operational information on the display 115 for the user's reference and convenience.

The processing unit 110 issues instructional information to the RF section 135, to initiate communication, for example, transmit radio signals comprising voice communication data. The RF section 135 comprises a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals would be transformed into audible or readable information outputted via the speaker 145, for example.

The processing unit 110 is adapted to verify the integrity of a security setup control message. The memory unit 130 is adapted to store the value of at least one security variable before the security variable is updated with new security setup information. It is contemplated that the memory unit 130 may include a shift register for storing the value of the security variable.

It is contemplated that the security setup information used to update the security variables may be extracted from the security setup control message. It is further contemplated that the processing unit 110 may be adapted to generate an authentication value, or expected message authentication code, based on the security setup control message which is then compared to an authentication message code received with the security setup control message.

Preferably the processing unit 110 includes software stored on recording media, such as CD ROM, floppy disk, hard disk, and optical magnetic disk, in a format that can be read by a computer. Preferably the expected message authentication code based on the security setup control message is generated using a standardized integrity check authentication generation algorithm adopted by 3GPP.

It will be apparent to one skilled in the art that the mobile station 100 can be readily implemented using, for example, the processing unit 110 or other data or digital processing device, either alone or in combination with external support logic.

In accordance with the present invention, if the contents of a security setup control message are changed during transmission between the transmitting party and the receiving party or if a security setup control message is received from an unauthenticated party, the message may be discarded and the value of security variables left unchanged. Therefore, messages received later may still be processed since there will be no difference between the security variables of the transmitting party and receiving party.

Performing the integrity check may include various security variables. For example, variables such as an integrity key (IK), COUNT-I, MESSAGE, a 1-bit direction identifier (DIRECTION), and FRESH may be utilized.

Figure 7:
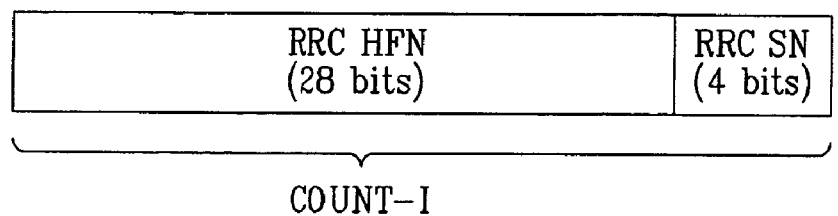
FIG. 7 illustrates one embodiment of the COUNT-I security variable.

FIG. 7 illustrates one embodiment of COUNT-I which is one of the security variables. COUNT-I is a value corresponding to a sequence number for integrity check.

COUNT-I includes two portions. One portion is a 28-bit RRC hyper frame number (HFN) while the other portion is a 4-bit RRC sequence number (SN).

When the security variables are updated, the 28-bit HFN upper portion of COUNT-I is reset. The reset HFN may be a START value transmitted previously by a terminal 100 or a specific predetermined value. The integrity check is performed on the received security setup control message using the updated security variables.

The IK parameter for performing the integrity check indicates an integrity key, which is generated from an authentication procedure in an upper layer of the RRC layer. The value of the IK is not transmitted via a radio interface. Instead, the upper layer of the RRC layer in the terminal 100 and a network, for example the UTRAN 200, respectively, calculate values of the IK to use based on specific input values.

The value of START is read from a SIM card 125 when the terminal 100 initiates connection between RRC layers of the UTRAN 200 and the terminal, and is transmitted to the UTRAN. The value of START, which is included in a message transmitted from the upper layer of the RRC layer of the terminal 100, may be transmitted to the UTRAN 200. While the connection between the RRC layers of the UTRAN 200 and terminal 100 is activated, the value of START is defined as the greatest number of upper 20 bits of the currently used values of COUNT-I or COUNT-C, which is used for ciphering and plays a role similar to COUNT-I. The value of START currently used between the RRC layers of the terminal 100 and UTRAN 200 is stored in the SIM card when the connection between the RRC layers of the terminal and UTRAN is terminated.

The MESSAGE parameter refers to a transmitted message.

The DIRECTION parameter is a direction discriminator and its value indicates whether a message is transmitted via uplink or downlink. DIRECTION can be set as either '0' or '1' to indicate uplink or downlink.

The FRESH parameter is a value given to each terminal 100 independently and is a value that the UTRAN 200 transmits to the terminal upon initialization of the RRC connection. The value of FRESH is an arbitrary number that the UTRAN 200 transmits to the terminal 100 and is used to ensure the security of the UTRAN if the terminal reuses the values of COUNT-I and message authentication code-I (MAC-I). The UTRAN 200 provides the terminal 100 with a new value every time an RRC connection is initiated.

The value of MAC-I is a message authentication code calculated using the UMTS integrity algorithm (UIA) and security variable values. It is an integrity checksum inserted in RRC PDU.

If there is no procedure for updating the value of FRESH, the security of the UTRAN 200 is vulnerable to a third party. The third party may easily request that the value of START that is used as an upper value of COUNT-I be set to a very small value when a new connection between RRC layers is requested and then use a pair of values of the SN and MAC-I which were previously used for the connection between the RRC layers. Assigning a new value to FRESH in the UTRAN 200 whenever a new connection is established between RRC layers may prevent this vulnerability.

Figure 8:
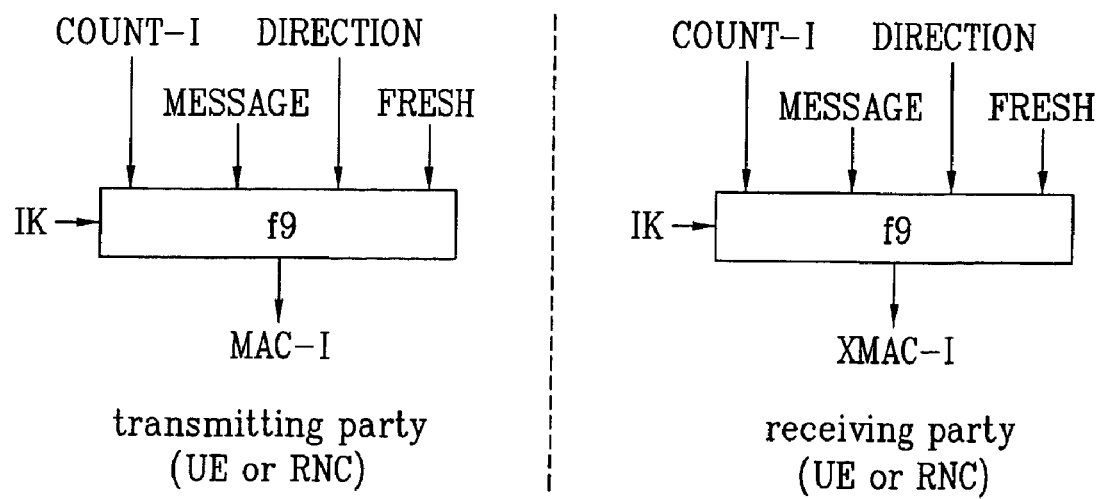
FIG. 8 is a block diagram illustrating one method of generating an expected message authentication code for an integrity check according to an embodiment of the present invention.

FIG. 8 illustrates one method of generating a message authentication code for the integrity check, in which 'f9' is a standardized integrity check authentication generation algorithm adopted by 3GPP. The UTRAN 200 and terminal 100 use the parameters as input values, thereby generating values of MAC-I and XMAC-I using an algorithm such as 'f9'. The MAC-I is an integrity check message authentication code generated by the UTRAN 200 and the XMAC-I is an integrity check message authentication code generated by the terminal 100.

If all input values of the UTRAN 200 and terminal 100 are equal, the values of MAC-I and XMAC-I generated by the method illustrated in FIG. 5 will also be equal. If the message is changed during transmission, the MESSAGE values of the receiving and transmitting parties are different and the value of XMAC-I will not equal the value of MAC-I.

Therefore, if the values of the MAC-I and XMAC-I are not equal, the integrity check fails and it is determined that either the contents of the received security setup control message were intentionally changed during transmission or the message was transmitted from an unauthenticated party. The security setup control message is then deemed unreliable.

The UTRAN 200 changes the input values used for the method illustrated in FIG. 5 whenever sending a new message. The UTRAN 200 also generates a new MAC-I using the changed input values. This prevents an unauthorized party from reusing the value of MAC-I to pass the integrity check.

In order to change the input values, the UTRAN 200 increments the SN value of COUNT-I by '1' whenever sending a message. As mentioned previously, the SN value is the lower 4 bits of COUNT-I. Therefore, the SN value can have values ranging from '0' to '15' and sequentially increases from '0' to '15'. Upon reaching '15', the SN value changes to '0' and increments in steps of '1' again. HFN, corresponding to the upper value of COUNT-I, is also incremented whenever the SN increments. Utilizing the method of the present invention increments COUNT-I each time a new message is sent while the input values are changed in a ciphering authentication value calculation procedure.

If the terminal 100 recognizes the SN value of the received message and determines that the SN value has completed one cycle, the terminal increments the HFN value. Therefore, COUNT-I coincides with COUNT-I of the transmitting party. Utilizing the method of the present invention, the terminal 100 and UTRAN 200 may have the same COUNT-I information even if only SN information is sent. Furthermore, security information interception by a third party can, which may occur if the entire COUNT-I is sent, is prevented.

The UTRAN 200 enables the receiving party to accurately calculate the XMAC-I value as well as adding the SN value as the lower portion of COUNT-I for each message transmission to prevent an unauthorized third party from passing the integrity check. The MAC-I value, which is used as a reference by the terminal 100 when performing the integrity check, is added to the transmitted message.

Once the terminal 100 receives the security setup control message, a check is performed of the SN value. The terminal 100 manages only its local SN parameter using the SN values received previously.

If the SN value transmitted together with the security setup control message is equal to the local SN value of the terminal 100, it is assumed that either a third party sent the message using the same security information of the transmitting party or that the same message was transmitted again from the authenticated UTRAN 200. The terminal discards the security setup control message.

The terminal 100 configures COUNT-I using the SN value received together with the security setup control message and calculates XMAC-I using the parameters set previously in COUNT-I. The parameters set previously include MESSAGE, DIRECTION, FRESH.

The terminal 100 performs the integrity check of the security setup control message by comparing the MAC-I value transmitted together with the security setup control message to the XMAC-I value calculated by the terminal. If the received security setup control message passes the integrity check, the receiving party stores the SN value included in the message in the local SN parameter and uses it for the SN value check of the next message.

The method illustrated in FIG. 5 described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for processing a security setup control message in a mobile communication system, the apparatus comprising:
    means for receiving the security setup control message comprising a reference authentication code;
    means for verifying integrity of the received security setup control message by generating an expected authentication value using security variables included in the received security setup control message and comparing the expected authentication value to the reference authentication code,
    wherein a value of at least one security variable is updated with new security setup information according to the received security setup control message if the integrity of the security setup control message is verified, and the value of the at least one security variable remains unchanged if the integrity of the security setup control message is not verified.

2. The apparatus of claim 1, further comprising means for storing a previous value of the at least one security variable before being updated with the new security setup information.

3. The apparatus of claim 2, wherein the means for storing the previous value of the at least one security variable comprises a memory unit.

4. The apparatus of claim 2, wherein the means for storing the previous value of the at least one security variable comprises a shift register.

5. The apparatus of claim 1, wherein the means for verifying the integrity of the security setup control message comprises a processor.

6. The apparatus of claim 1, wherein the means for verifying the integrity of the security setup control message comprises software stored on recording media.

7. The apparatus of claim 1, wherein the new security setup information is extracted from the received security setup control message.

8. The apparatus of claim 1, wherein the apparatus is located in user equipment (UE).

9. The apparatus of claim 1, wherein the apparatus is located in a universal mobile telecommunications system (UMTS) terrestrial radio access network (UTRAN).

10. The apparatus of claim 1, wherein the means for verifying the integrity of the received security setup control message comprises a standardized integrity check authentication generation algorithm.

11. A method for processing a security setup control message in a mobile communication system, the method comprising:
    receiving the security setup control message comprising a reference authentication code;
    verifying integrity of the received security setup control message by generating an expected authentication value using security variables included in the received security setup control message and comparing the expected authentication value to the reference authentication code; and
    processing the security setup control message and updating a value of at least one security variable with new security setup information according to the received security setup control message if the integrity of the security setup control message is verified, and discarding the security setup control message and leaving the value of the at least one security variable unchanged if the integrity of the security setup control message is not verified.

12. The method of claim 11, further comprising storing a previous value of the at least one security variable before being updated with the new security setup information.

13. The method of claim 11, further comprising extracting the new security setup information from the security setup control message.

14. The method of claim 11, further comprising performing a standardized integrity check authentication generation algorithm.

15. The method of claim 11, wherein the security setup control message is processed if the received reference authentication code is equal to the expected authentication value, and the security setup control message is discarded if the received reference authentication code is not equal to the expected authentication value.

16. The method of claim 11, wherein the security setup control message is an RRC (radio resource control) message.

17. The method of claim 11, wherein the security setup control message is a signaling message.

18. An mobile station for processing a security setup control message in a mobile communication system, the mobile station comprising:
    an RF module;
    a power management module;
    an antenna receiving the security setup control message comprising a reference authentication code;
    a battery;
    a keypad;
    a memory unit;
    a speaker;
    a microphone; and
    a processing unit verifying integrity of the security setup control message by generating an expected authentication value using security variables included in the received security setup control message and comparing the expected authentication value to the reference authentication code,
    wherein a value of at least one security variable is updated with new security setup information according to the received security setup control message if the integrity of the security setup control message is verified, and the value of the at least one security variable remains unchanged if the integrity of the security setup control message is not verified.

19. The mobile station of claim 18, wherein the memory unit is stores a previous value of the at least one security variable before being updated with the new security setup information.

20. The mobile station of claim 19, wherein the memory unit comprises a shift register.

21. The mobile station of claim 18, wherein the memory unit comprises a flash memory.

22. The mobile station of claim 18, wherein the memory unit comprises a ROM.

23. The mobile station of claim 18, wherein the memory unit comprises an SRAM.

24. The mobile station of claim 18, wherein the processing unit comprises a microprocessor.

25. The mobile station of claim 18, wherein the processing unit comprises software stored on recording media.

26. The mobile station of claim 18, wherein the new security setup information is extracted from the security setup control message.

27. The mobile station of claim 18, wherein the processing unit comprises a standardized integrity check authentication generation algorithm.

28. The mobile station of claim 18, further comprising a subscriber identity module (SIM) card.

* * * * *